United States Patent
Lopez et al.

(10) Patent No.: US 9,067,286 B2
(45) Date of Patent: Jun. 30, 2015

(54) PISTON RING FOR A PISTON OF AN INTERNAL COMBUSTION ENGINE, AND A METHOD FOR PRODUCING SAME

(75) Inventors: Daniel Lopez, Stuttgart (DE); Richard Alves, Braga (PT)

(73) Assignee: MAHLE International GmbH, Stuttgart (DE)

( * ) Notice: Subject to any disclaimer, the term of this patent is extended or adjusted under 35 U.S.C. 154(b) by 88 days.

(21) Appl. No.: 13/996,712

(22) PCT Filed: Dec. 21, 2011

(86) PCT No.: PCT/DE2011/002161
§ 371 (c)(1),
(2), (4) Date: Feb. 21, 2014

(87) PCT Pub. No.: WO2012/083930
PCT Pub. Date: Jun. 28, 2012

(65) Prior Publication Data
US 2014/0311437 A1    Oct. 23, 2014

(30) Foreign Application Priority Data

Dec. 24, 2010 (DE) .......................... 10 2010 056 168
Dec. 6, 2011 (DE) .......................... 10 2011 120 145

(51) Int. Cl.
| B23P 15/08 | (2006.01) |
| B23P 15/06 | (2006.01) |
| F16J 9/20 | (2006.01) |
| F16J 9/26 | (2006.01) |

(52) U.S. Cl.
CPC ............ B23P 15/06 (2013.01); *Y10T 29/49281* (2015.01); *Y10T 29/49274* (2015.01); *Y10T 29/49284* (2015.01); F16J 9/206 (2013.01); F16J 9/26 (2013.01)

(58) Field of Classification Search
CPC .............. B23P 15/06; F16J 9/26; F16J 9/206; Y10T 29/49284; Y10T 29/49274; Y10T 29/49281
See application file for complete search history.

(56) References Cited

U.S. PATENT DOCUMENTS 6,199,274 B1    3/2001    Preyer
7,117,594 B2   10/2006    Preyer
(Continued)

FOREIGN PATENT DOCUMENTS

DE    197 52 720 A1    6/1999
DE    103 59 802 B3    3/2005
(Continued)

OTHER PUBLICATIONS

International Search Report of PCT/DE2011/002161, May 2, 2012.
(Continued)

*Primary Examiner* — Ryan J Walters
(74) *Attorney, Agent, or Firm* — Collard & Roe, P.C.

(57) ABSTRACT

The invention relates to a method for producing a piston ring (30, 130, 230) for a piston (10) of an internal combustion engine, comprising a ring back (31), an upper ring flank (32), a lower ring flank (33), and a running surface (42), and the method comprising the following method steps: (a) preparing a ring blank (30') with a ring back (31'), an upper ring flank (32'), a lower ring flank (33'), and an outer lateral face (34'), (b) shaping an asymmetrical convex contour (35) along the outer lateral face (34') and shaping a radially outward-extending protrusion (36) in the outer lateral surface (34') in the region of the lower ring flank (33'), (c) coating the outer lateral surface (34') with a coating material, (d) removing the protrusion (36), thereby exposing the material of the ring blank (30') in the shape of a circumferential surface (41) which blends into the coating (39), and forming an oil scraper edge (40) between the circumferential surface (41) and the lower ring flank (33'), and (e) post and/or final processing of the coated ring blank (30') to obtain a finished piston ring (30, 130, 230).

12 Claims, 3 Drawing Sheets

(56) References Cited

U.S. PATENT DOCUMENTS

| | | | |
|---|---|---|---|
| 7,871,078 B2 | 1/2011 | Fischer et al. | |
| 2002/0190476 A1 | 12/2002 | Preyer | |
| 2007/0128807 A1* | 6/2007 | Fischer et al. | ............... 438/266 |
| 2012/0205876 A1 | 8/2012 | Fujimura et al. | |
| 2012/0298067 A1 | 11/2012 | Esser | |

FOREIGN PATENT DOCUMENTS

| | | |
|---|---|---|
| DE | 10 2010 001 434 A1 | 8/2011 |
| DE | 10 2010 047 836 A1 | 4/2012 |
| EP | 1 409 896 B1 | 6/2007 |
| WO | WO 2011/064888 A1 | 6/2011 |
| WO | WO 2012/045294 A1 | 4/2012 |

OTHER PUBLICATIONS

German Search Report in German Application No. 10 2011 120 145.2, Jan. 4, 2013.

English translation of the International Preliminary Report on Patentability in PCT/DE2011/002161, Jun. 25, 2013.

* cited by examiner

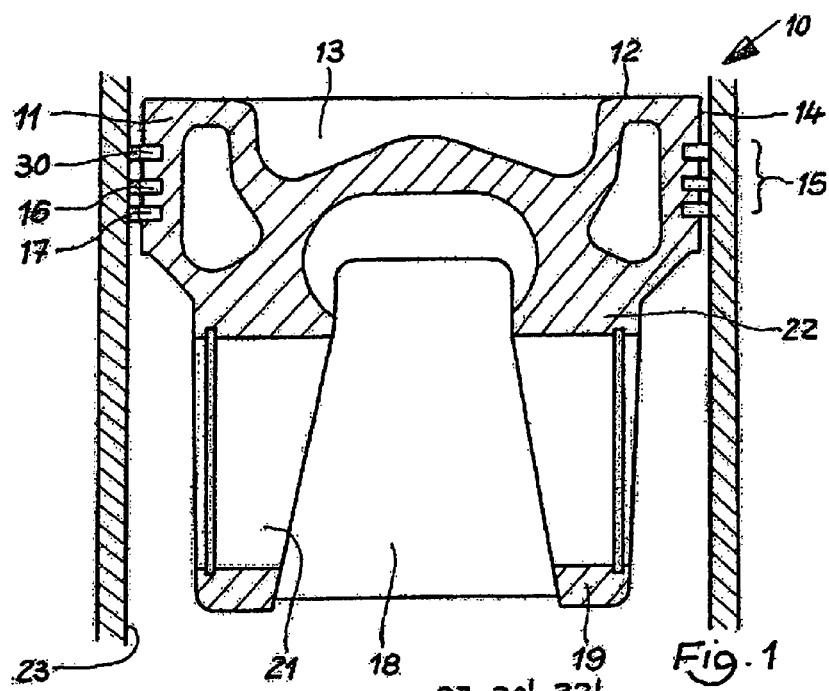
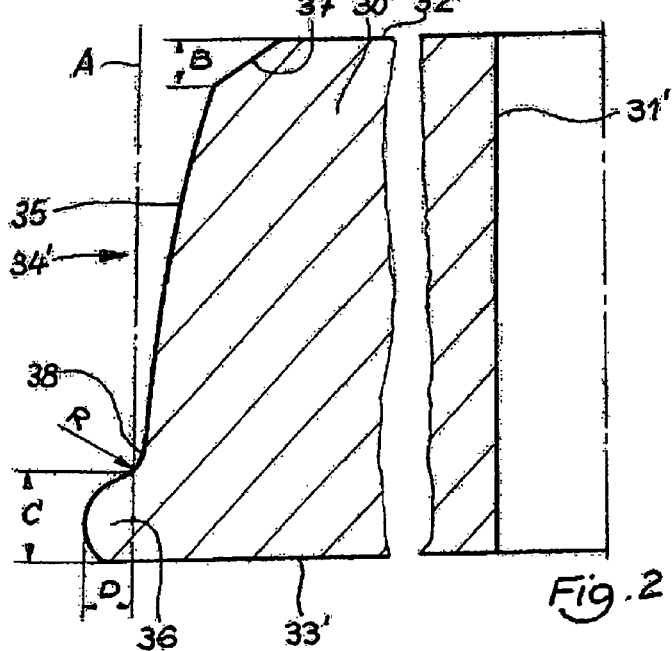

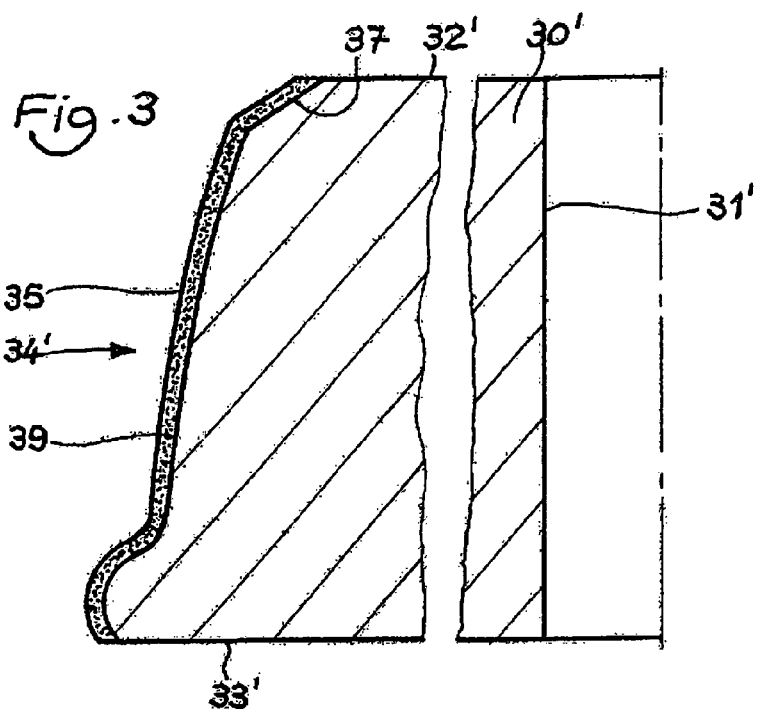
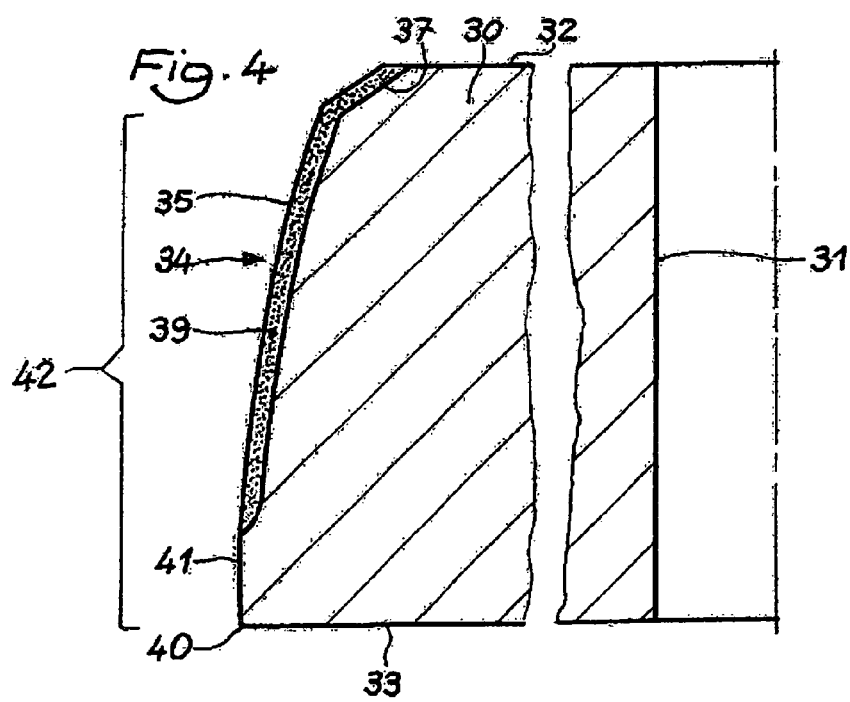

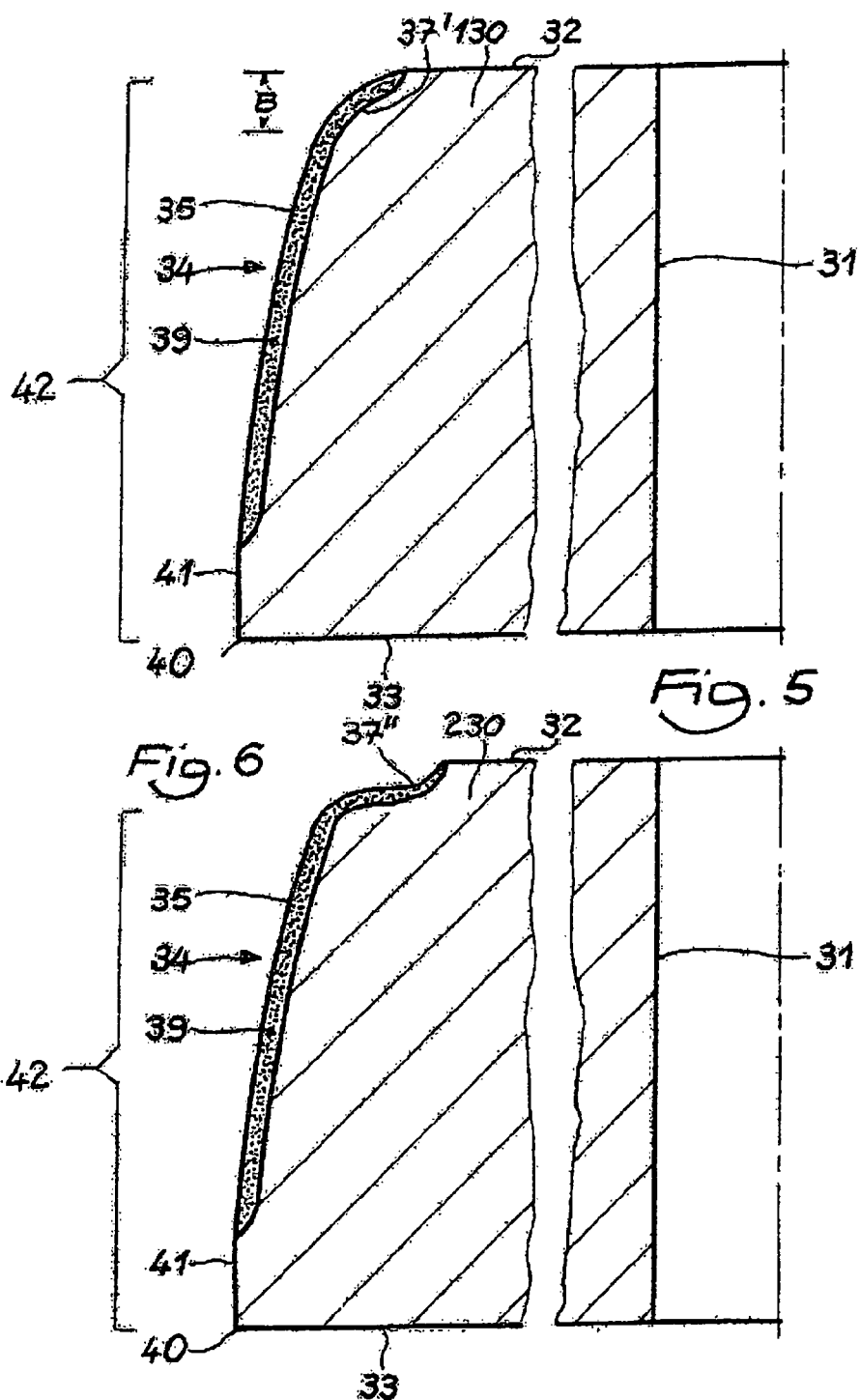

PISTON RING FOR A PISTON OF AN INTERNAL COMBUSTION ENGINE, AND A METHOD FOR PRODUCING SAME

CROSS REFERENCE TO RELATED APPLICATIONS

This application is the National Stage of PCT/DE2011/002161 filed on Dec. 21, 2011 which claims priority under 35 U.S.C. §119 of German Application No. 10 2010 056 168.1 filed on Dec. 24, 2010 and under 35 U.S.C. §119 of German Application No. 10 2011 120 145.2 filed on Dec. 6, 2011, the disclosures of which are incorporated by reference. The international application under PCT article 21(2) was not published in English.

The present invention relates to a method for the production of a piston ring for a piston of an internal combustion engine, having a ring back, an upper ring side, a lower ring side, and a working surface. The present invention furthermore relates to such a piston ring.

In modern gasoline and diesel engines, the construction height and thereby the compression height of the pistons are reduced, in order to save weight. Furthermore, a reduction in the height of the uppermost piston rings (compression rings) is aimed at, in order to minimize friction losses. The radial contact pressure of the piston rings is also reduced, particularly at the oil control ring, in order to minimize friction losses. In contrast, the ignition pressures and temperatures in the region of the piston head, as well as the speeds of rotation and thereby the number of stroke movements of the piston per minute are increased. Therefore it is necessary to monitor the oil consumption, in order to avoid insufficient supply of lubricant oil, on the one hand, and the formation of oil carbon in the region of the piston rings as well as in the region of the ring grooves, on the other hand.

A piston ring, particularly a compression ring, is not allowed to strip off the oil film in an upward direction toward the combustion chamber during engine operation, because otherwise, the oil consumption of the internal combustion engine increases greatly. Furthermore, there is the risk of oil carbon formation, as well as of seizing of the piston ring. Experience has shown that in the case of rectangular rings with a cylindrical working surface, a barrel-shaped working surface and therefore the desirable wedge gap occur on their own, due to wear, after an extended period of use, as a result of piston tilt. On the basis of this experience, piston rings are available nowadays, from standard production, which are already produced with a barrel-shaped working surface. Piston rings with a symmetrically or asymmetrically barrel-shaped working surface are used.

In engine operation, the oil film between piston ring and cylinder wall has an important sealing function. In the case of an asymmetrically barrel-shaped working surface, a particularly marked oil pressure barrier forms. The gas pressure acting on the piston ring from the direction of the ring back squeezes the oil film in such a manner that the highest "barrier pressure" occurs in the region just ahead of the lower edge of the piston ring. The gas therefore cannot flow in the direction of the crankcase.

At the same time, such a piston ring strips off excess oil, toward the crankcase, during the downward movement of the piston. In this way, excess oil is prevented from being transported to the combustion chamber or collecting in the region of the piston rings or ring grooves.

The task of the present invention consists in further developing a method of the stated type in such a manner that a piston ring is obtained that strips off excess oil during engine operation, particularly effectively, toward the crankcase.

The solution consists of a method having the following characteristics: (a) making available a ring blank having a ring back, an upper ring side, a lower ring side, and an outer mantle surface, (b) forming an asymmetrically barrel-shaped contour along the outer mantle surface and forming a projection in the outer mangle surface, in the region of the lower ring side, which projection extends radially toward the outside, (c) coating the outer mantle surface with a coating material, (d) removing the material of the projection, thereby exposing the material of the ring blank in the form of a circumferential surface that makes a transition into the coating, and forming an oil stripping edge between the circumferential surface and the lower ring side, (e) subsequent machining and/or finish-machining of the coated ring blank to produce a finished piston ring.

With the method according to the invention, a piston ring having an asymmetrically barrel-shaped working surface is obtained in particularly simple and efficient manner, which ring is provided with a marked oil stripping edge and guarantees particularly effective transport of excess oil in the direction of the crankshaft during engine operation. Because a bevel or convex-shaped radius or a concave-shaped radius is formed in the region of the outer mantle surface, between the asymmetrically barrel-shaped contour and the upper ring side, a smooth and flush transition between the coating of the mantle surface and the upper ring side is achieved during the course of the method (see below, step (d)). The bevel or the radius has an axial height of B=0.10-0.30 mm; the broken edge has one of B=minus 0.4 mm.

The piston ring that can be obtained according to the invention is particularly well suited for use as a compression ring. A piston ring according to the invention is particularly characterized in that it is configured as a piston ring that is chambered on one side (cf. ISO 6621-4), i.e. has a working surface that is chambered on one side, which is provided with a thin layer. With the method according to the invention, it is therefore possible, for the first time, to produce a ring chambered on one side, having a coated working surface in the form of a thin layer (i.e. a layer that can be obtained by means of PVD methods, CVD methods, or DLC methods). Such a piston ring furthermore makes the production of a sharp oil stripping edge possible, which is freed from the coating. This oil stripping edge can be structured with a slight height, by means of the method according to the invention, thereby improving the seal with regard to what is called "blow-by," i.e. the combustion gas that flows past the piston rings in the direction of the crankshaft during the compression step.

The present invention can be used not only in gasoline engines of all types (for example gasoline engines with direct injection, sports engines), but also in diesel engines for motor vehicles and utility vehicles of all kinds, also for sports engines.

Advantageous further developments are evident from the dependent claims.

With the method according to the invention, it is possible to use ring blanks having any desired cross-sectional shape. Particularly well suited, for example, are ring blanks in the form of a half keystone ring, a keystone ring or a rectangular ring.

The ring blanks can be produced from any suitable material, depending on the requirements of an individual case. These particularly include steel materials, for example carbon steels or stainless steels, as well as cast iron materials. Suitable materials are, for example, according to ISO 6621-3, Class 10—gray cast iron (untreated), Class 20—gray cast iron (heat-treated), Class 30—pearlite or martensite cast iron (heat-treated), Class 40—carbide, pearlite or martensite forgeable cast iron (heat-treated), Class 50—pearlite, martensite or ferrite cast iron with spheroidal graphite (heat-treated); Sub-class 53, 56 for spheroidal graphite cast iron), Class 60—steel (alloyed or non-alloyed; Sub-classes MC65 or MC66 for stainless steel, Sub-classes MC 61, MC 62, MC 63 or MC64 for alloyed steels).

A particularly advantageous further development consists in that the projection is formed with an axial height of C=0.10-0.55 mm and/or with a radial width of D=0.07-0.09 mm. In this way, a circumferential surface is obtained during the course of the method, the axial height of which is dimensioned to be sufficiently large to form a reliably acting and strong oil stripping edge, without the function of the working surface of the piston ring being impaired (cf. below, step (d)).

It is practical if a curve-shaped transition is formed between the asymmetrically barrel-shaped contour and the projection, in order to minimize the risk of crack formation. This curve-shaped transition region preferably has a radius of R=0.10-0.30 mm.

Before coating of the outer mantle surface, one or more adhesive or intermediate layers can be applied, in known manner, for example metallic layers composed of chromium, titanium, tungsten, zirconium, vanadium and/or niobium. Aside from the mantle surface, in step (c), the upper ring side and/or the lower ring side and/or the ring back can additionally be coated with at least one coating agent, of course.

Coating preferably takes place by means of a PVD method, a CVD method or a DLC method. The thin layers that can be obtained in this manner are extremely wear-resistant and impart a high level of freedom from seizing to the piston ring according to the invention. The use of more recent PVD methods such as, for example, PACVD methods, HIPIMS methods (high-performance impulse magnetron sputtering) or arc discharge (laser arc methods) is particularly preferred. All these methods are known to a person skilled in the art.

For this purpose, depending on the requirements of an individual case, all suitable and known coating materials, such as, for example, chromium nitride, alloyed chromium nitride, chromium carbide, chromium aluminum nitride, chromium oxide, titanium nitride, titanium aluminum nitride, titanium carbonitride, titanium boride, zirconium carbide, zirconium nitride, hydrogenous carbon, hydrogen-free carbon and/or metal-doped hydrogenous carbon can be used.

An exemplary embodiment of the invention will be explained in greater detail below, using the attached drawings. These show, in a schematic representation, not true to scale:

FIG. 1 an exemplary embodiment of a piston for a piston ring according to the invention, in section;

FIG. 2 a detail view of the contour of the mantle surface of a ring blank for a first exemplary embodiment of a piston ring according to the invention;

FIG. 3 the ring blank according to FIG. 2 after coating;

FIG. 4 the finished piston ring according to the invention;

FIG. 5 a further exemplary embodiment of a finished piston ring according to the invention;

FIG. 6a further exemplary embodiment of a finished piston ring according to the invention.

FIG. 1 shows an exemplary embodiment of a piston 10 for a piston ring 30 according to the invention. In the exemplary embodiment, the piston 10 is a one-part box piston that can be produced from any desired metallic material. The piston 10 has a piston head 11 with a piston crown 12, a combustion bowl 13, a circumferential top land 14, and a ring belt 15, in the ring grooves of which three piston rings 30, 16, 17, namely a compression ring 30, an intermediate ring 16, and an oil control ring 17 are accommodated. The piston 10 furthermore has a piston skirt 18, pin bosses 19 that are set back relative to the top land 14, with pin bores 21 for accommodation of a piston pin (not shown), as well as pin boss supports 22. The piston 10 is accommodated, in known manner, in the assembled state, in a cylinder, the working surface 23 of which is indicated in FIG. 1. The working surface 23 can be formed, in known manner, either from the bore of the cylinder crankcase or from a cylinder sleeve.

In the exemplary embodiment, the compression ring 30 is configured according to the invention or produced according to the method according to the invention. Of course, each of the piston rings or two or three piston rings can be produced according to the method according to the invention.

FIG. 2 shows a ring blank 30' for a piston ring 30 according to the invention. The top of the piston ring 30 to be produced is referred to as "TOP," in usual manner. The ring blank 30' has a ring back 31', an upper ring side 32', a lower ring side 33', and an outer mantle surface 34'. The ring blank 30' consists, in the exemplary embodiment, of one of the aforementioned materials according to ISO 6621-3, for example cast iron with spheroidal graphite (Sub-class MC 53 or MC 56), and is configured as a keystone ring in cross-section, for example.

Along the outer mantle surface 34', an asymmetrically barrel-shaped contour 35 is first formed, in known manner. The calculation of the asymmetrically barrel-shaped contour 35 is known to a person skilled in the art.

At the same time, a projection 36 that extends radially outward is formed into the outer mantle surface 34', in the region of the lower ring side 33'. In the exemplary embodiment, the projection 36 has an axial height C=0.30 mm, and, with reference to a reference line A, a radial width D=0.08 mm. The reference line A is positioned in such a manner that the projection 36 projects beyond the reference line A by a region that approximately corresponds to twice the layer thickness of the coating to be applied later. Depending on the requirements in an individual case, the layer thickness amounts to about 2 µm-60 µm.

Between the asymmetrically barrel-shaped contour 35 and the projection 36, a curve-shaped transition region 38 is formed, in order to minimize the risk of crack formation. This curve-shaped transition region 38 has a radius of R=0.20 mm in the exemplary embodiment.

Furthermore, in the exemplary embodiment, a bevel 37 is formed between the asymmetrically barrel-shaped contour 35 and the upper ring side 32' in the region of the outer mantle surface 34'. In the exemplary embodiment, the bevel 37 has an axial height of B=0.22 mm.

With this, the outer mantle surface 34' has been finish-machined. This machining can take place, in known manner, using a chip-removing method, depending on the material used for the ring blank 30'.

In the exemplary embodiment, the ring blank 30' is coated with chromium nitride, by means of a known PVD method, such as, for example, PCD arc discharge. To prepare for coating of the ring blank 30', the latter is cleaned in known manner and, if necessary, coated with an adhesion-imparting layer consisting of chromium. In the exemplary embodiment, only the outer mantle surface 34' is coated. In addition, the upper ring side 32' and/or the lower ring side 33' and/or the ring back 31' can be coated with one or more coating materials. In the exemplary embodiment, the outer mantle surface 34' is coated with a coating 39 of the type MIP230 composed of chromium nitride. The coating 39 has a porous, single-phase ceramic structure having a hardness of 1,200 HV to 1,600 HV (Vickers).

FIG. 3 shows the coated ring blank 30'. It can be seen well that the bevel 37 produces a smooth and flush transition between the coating 39 and the upper ring side 32'.

FIG. 4 shows the finished piston ring 30 with ring back 31, upper ring side 32, lower ring side 33, and coated outer mantle surface 34. For production of the finished piston ring 30, first the material of the projection 36 is removed by means of chip-removing machining. In this connection, a circumferential surface 41 is formed, in the region of which the material of the ring blank 30' or of the piston ring 30 is exposed. The circumferential surface 41 makes a smooth and flush transition into the asymmetrically barrel-shaped contour 35. With the removal of the material of the projection 36, a sharp oil stripping edge 40 is formed, at which the circumferential surface 41 and the lower ring side 33 coincide.

Finally, the piston ring 30 is subsequently machined and/or finish-machined, in known manner, so that the finished working surface 42 is obtained in the region of the circumferential surface 41 as well as the coated asymmetrically barrel-shaped contour 35.

FIG. 5 shows a further exemplary embodiment of a finished piston ring 130 according to the invention. The piston ring 130 essentially corresponds to the piston ring 30 according to FIGS. 1 to 4 and is produced using the same method according to the invention. The same structural elements are therefore provided with the same reference numbers, and reference is made, in this regard, to the description relating to FIGS. 1 to 4.

The only difference consists in that a convex-shaped radius 37' is formed on the piston ring 130, in the region of the outer mantle surface 34, between the asymmetrically barrel-shaped contour 35 and the upper ring side 32. In the exemplary embodiment, the radius 37' has an axial height of B=0.22 mm. It can be seen well that the radius 37' also produces a smooth and flush transition between the coating 39 and the upper ring side 32.

FIG. 6 shows another exemplary embodiment of a finished piston ring 230 according to the invention. The piston ring 230 essentially corresponds to the piston ring 30 according to FIGS. 1 to 4 and is produced using the same method according to the invention. The same structural elements are therefore provided with the same reference numbers, and reference is made, in this regard, to the description relating to FIGS. 1 to 4.

The only difference consists in that a concave-shaped radius 37" is formed on the piston ring 230, in the region of the outer mantle surface 34, between the asymmetrically barrel-shaped contour 35 and the upper ring side 32. It can be seen well that the radius 37" also produces a smooth and flush transition between the coating 39 and the upper ring side 32.

In the end result, a piston ring 30, 130, 230 for use as a compression ring is obtained, which is provided with a marked oil stripping edge and guarantees particularly effective transport of excess oil in the direction of the crankshaft during engine operation.

The invention claimed is:

1. Method for the production of a piston ring (30, 130, 230) for a piston (10) of an internal combustion engine, having a ring back (31), an upper ring side (32), a lower ring side (33), and a working surface (42), comprising the following method steps:
   a) making available a ring blank (30') having a ring back (31'), an upper ring side (32'), a lower ring side (33'), and an outer mantle surface (34'),
   (b) forming an asymmetrically barrel-shaped contour (35) along the outer mantle surface (34') and forming a projection (36) in the outer mantle surface (34'), in the region of the lower ring side (33'), which projection extends radially outward,
   (c) forming a bevel (37), a convex-shaped radius (37') or a concave-shaped radius (37") having an axial height of B=0.10-0.30 mm in the region of the outer mantle surface (34') between the asymmetrically barrel-shaped contour (35) and the upper ring side (32'),
   (d) coating the outer mantle surface (34') with a coating material,
   (e) removing the material of the projection (36), thereby exposing the material of the ring blank (30') in the form of a circumferential surface (41) that makes a transition into the coating (39), and forming an oil stripping edge (40) between the circumferential surface (41) and the lower ring side (33'),
   (f) subsequent machining and/or finish-machining of the coated ring blank (30') to produce a finished piston ring (30, 130, 230).

2. Method according to claim 1, wherein in step (a), a ring blank (30') in the form of a half keystone ring, a keystone ring, or a rectangular ring is used.

3. Method according to claim 1, wherein in step (a), a ring blank (30') composed of a steel material or of a cast iron material is used.

4. Method according to claim 1, wherein in step (b), the projection (36) is formed with an axial height of C=0.10-0.55 mm and/or with a radial width of D=0.07-0.09 mm.

5. Method according to claim 1, wherein in step (b), a curve-shaped transition region (38) is formed between the asymmetrically barrel-shaped contour (35) and the projection (36).

6. Method according to claim 5, wherein the curve-shaped transition region (38) is formed with a radius of R=0.10-0.30 mm.

7. Method according to claim 1, wherein between step (c) and step (d), one or more adhesive or intermediate layers is/are applied to the outer mantle surface (34').

8. Method according to claim 1, wherein in step (d), in addition, the upper ring side (32') and/or the lower ring side (33') and/or the ring back (31') is/are coated with at least one coating agent.

9. Method according to claim 1, wherein in step (d), coating takes place by means of a PVD method or a CVD method or a DLC method.

10. Piston ring (30, 130, 230) produced using the method according to claim 1.

11. Piston ring (30, 130, 230) for a piston (10) of an internal combustion engine, having a ring back (31), an upper ring side (32), a lower ring side (33), and a working surface (42) chambered on one side and provided with a coating (39), wherein the working surface (42) has an asymmetrically barrel-shaped contour, wherein the working surface (42) makes a transition into the upper ring side (32) by way of a bevel (37), a convex-shaped radius (37') or a concave-shaped radius (37") having an axial height of B=0.10-0.30 mm, and wherein a circumferential surface (41) makes a transition into the coating (39) and makes a transition into the lower ring side (33), forming the oil stripping edge (40).

12. Piston ring (30, 130, 230) according to claim 11, wherein the piston ring is a compression ring.

* * * * *